April 27, 1948.  P. E. SANDORFF  2,440,616
APPARATUS FOR TESTING PANELS AND THE LIKE
Filed Dec. 2, 1944  2 Sheets-Sheet 1
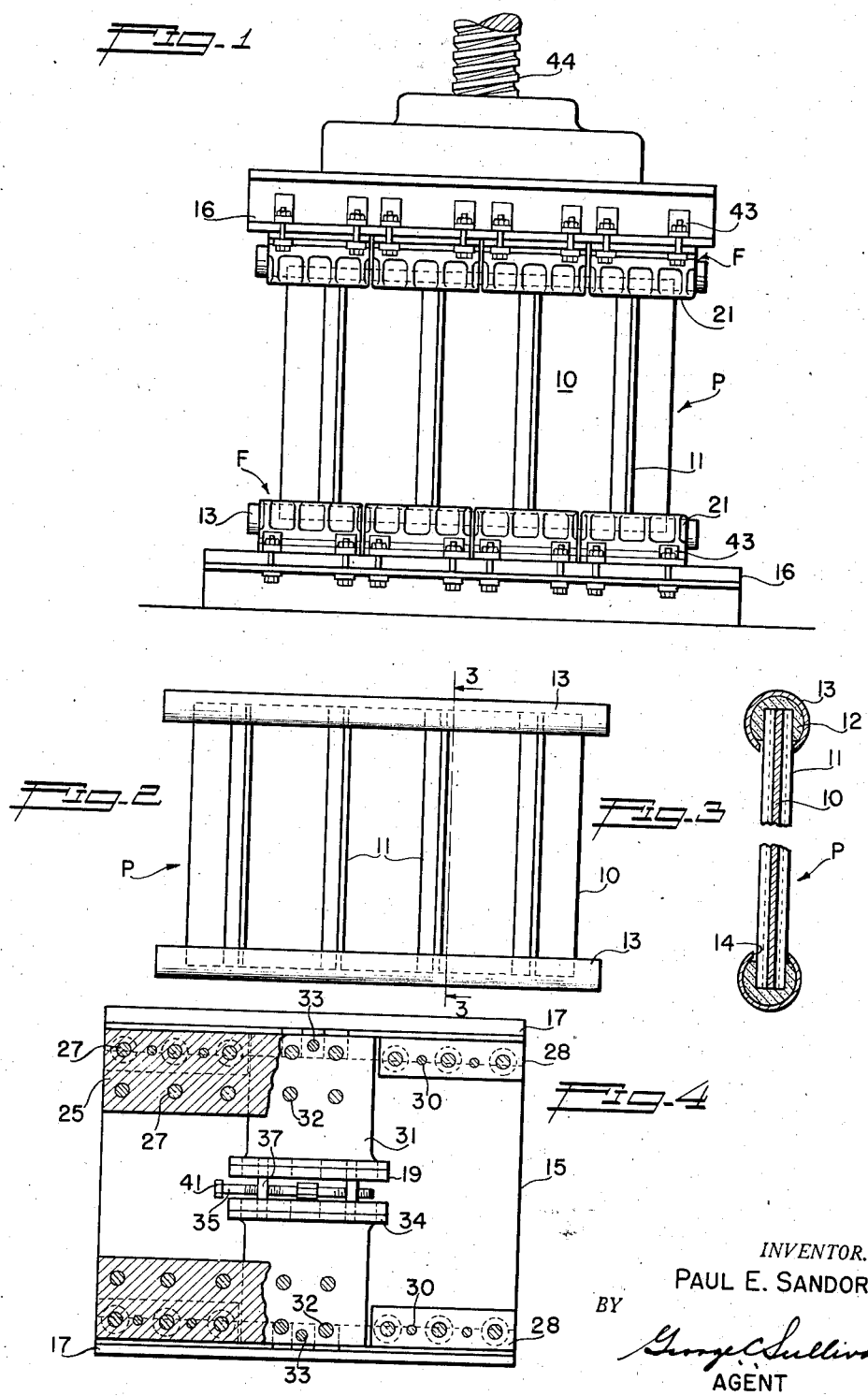
INVENTOR.
PAUL E. SANDORFF
BY George C. Sullivan
AGENT

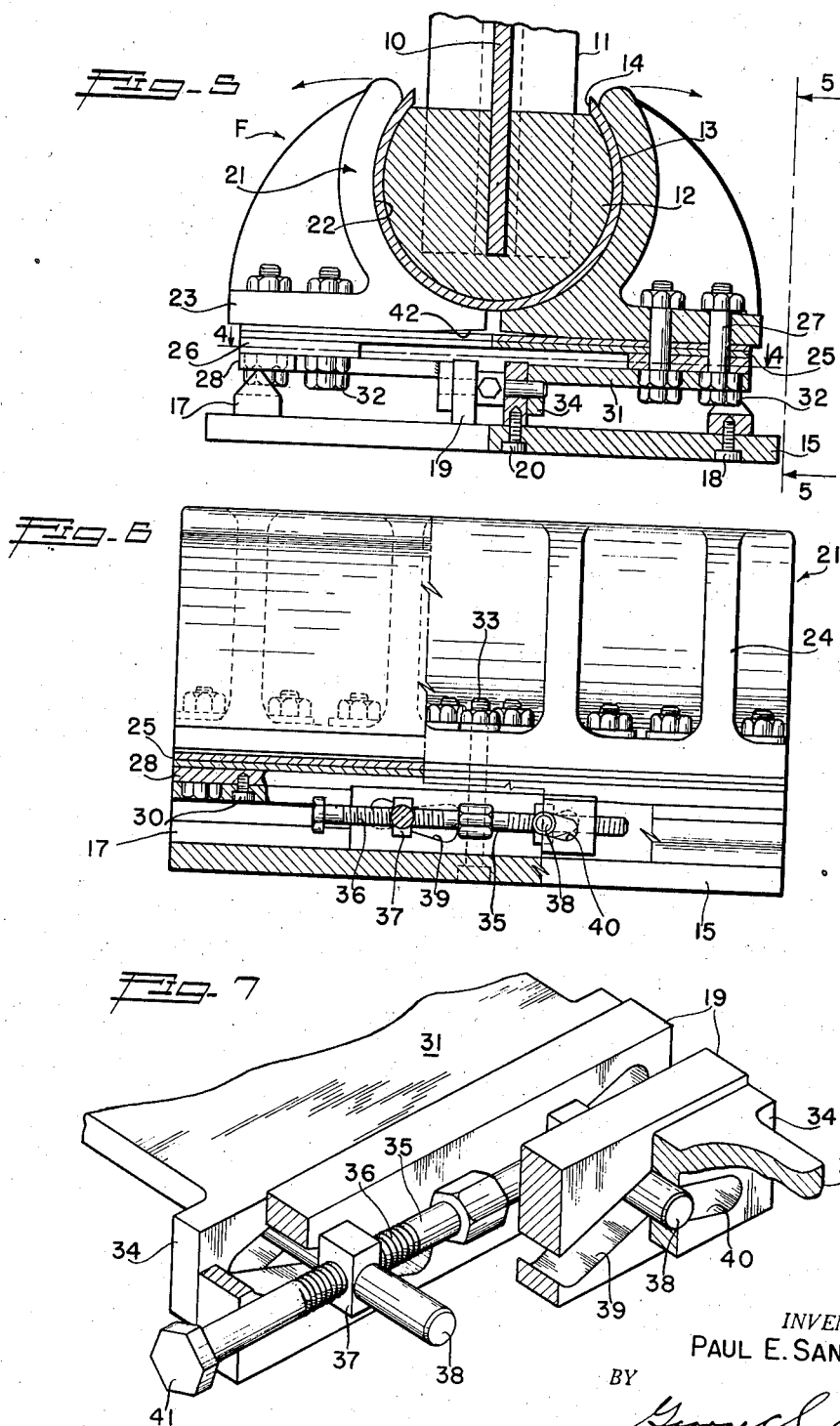

Patented Apr. 27, 1948

2,440,616

UNITED STATES PATENT OFFICE 2,440,616

APPARATUS FOR TESTING PANELS AND THE LIKE

Paul E. Sandorff, Los Angeles, Calif., assignor to Lockheed Aircraft Corporation, Burbank, Calif.

Application December 2, 1944, Serial No. 566,339

14 Claims. (Cl. 73—94)

This invention has to do with the testing of parts and components, and has more particular reference to apparatus for testing structural parts and combinations to determine the allowable compressive stresses for the same.

In conventional compression panel tests the only readily determinable factors or quantities are the axial column load applied, the failure load and the length of the column. The end fixity co-efficient, including all end effects such as elastic restraint, eccentricity and loading conditions, has heretofore been incapable of accurate determination. Where the value of the end fixity co-efficient is uncertain an attempt must be made to determine this factor from considerations outside of the column load relation to arrive at the allowable design stresses of the panel as it is to be employed. Furthermore, the data obtained by conventional panel testing methods is often misleading because of the variation in the effective moment of inertia of the specimen in column action due to buckling of a given part or parts of the specimen. Where the skin buckles it is difficult or impossible to evaluate accurately the radius of gyration, or the moment of inertia, and it has been the practice to employ the radius of gyration of a stiffener alone. This property, in connection with the test data, is ordinarily used to construct a curve depicting the relationship of strength to length, under the conditions of end fixity obtaining during the tests. By comparison with the theoretical Euler relationship known to apply at stresses insufficient to cause plastic yielding of the material, the value of the end fixity is inferred. This method is inaccurate because of the possible variation in test end fixity conditions between the specimens in the elastic range and those in the plastic range, and also because of the aforementioned effects of buckling when they occur in either the elastic or plastic range. Furthermore, the presence of slight eccentricity of loading or of irregularity in construction of the specimen may introduce error which may vary with the degree of end restraint provided to the specimen. This difficulty would not be present if full end fixity of the specimen was insured. Although it has been the general practice to carefully machine the ends of the specimen "flat, square and parallel" in an attempt to obtain good end fixity, it has been found that the end fixity coefficient of panels thus prepared may vary considerably. These variations result from several causes such as bearing conditions at the ends of the panel, initial eccentricities of the specimen or panel, localized yielding and irregular load transfer at the panel ends, lateral motion of the testing head caused by side loads which cannot be avoided even with close machining tolerances, etc. Where it has been impossible to accurately determine the value of the end fixity coefficient of milled end panels, it has been necessary to assume a given more or less arbitrary value for this factor in evaluating the results of the tests.

An object of the invention is to provide an apparatus for the compression testing of panels and the like, which facilitates the obtaining of accurate test data under known or definite loading conditions. The apparatus permits the accurate positioning and aligning of the specimen prior to the application of the test loading and the maintenance of the alignment during the test period while preserving complete end fixity of the panel.

Another object of the invention is to provide an apparatus of the class mentioned in which the end portions of the panel are embedded in matrix material cast in tubes which in turn are held by special clamp fixtures operable to transmit the axial test loads to the tubes, matrix material and panel. The clamping action of the fixtures automatically produced by the axial loading develops pressures in the matrix material so that uniformly distributed axial loading is transmitted to the test panel.

A further object of the invention is to provide an apparatus of the character referred to in which the clamp fixtures are self-energizing under the test loading, embodying jaws supported in a manner to pivot toward one another under the test loads to securely grip and clamp the matrix tubes provided on the ends of the panel, which fixtures further include mechanisms having a high mechanical advantage for operating the jaws to obtain an initial clamping force prior to the application of the test loads.

Other objects and features of the invention will be readily understood from the following detailed description of a typical preferred form of the invention wherein reference will be made to the accompanying drawings in which:

Figure 1 is a side elevation of a test panel secured in a test machine by the clamping means of the invention, the machine being shown in a more or less diagrammatic manner;

Figure 2 is a side elevation of a test panel and end tubes;

Figure 3 is an enlarged vertical detailed sectional view taken as indicated by line 3—3 on Figure 2;

Figure 4 is a horizontal detailed sectional view taken as indicated by line 4—4 on Figure 5, with certain parts appearing in elevation;

Figure 5 is an enlarged fragmentary vertical detailed sectional view of one of the clamp means showing it in gripping engagement of one of the end tubes of a panel and illustrating several parts in elevation;

Figure 6 is a side elevation of the clamp unit of Figure 5 taken substantially as indicated by line 6—6 on Figure 5 with the panel end tube removed and showing certain parts of the clamp means in vertical cross section; and Figure 7 is an enlarged fragmentary perspective view of the screw mechanism of the clamp unit.

The method and apparatus of the invention are useful in the compression testing of parts, assemblies and components of various characters, and formed of materials differing considerably in their physical characteristics. In the drawings I have shown the apparatus employed in connection with the testing of an aircraft panel constructed of aluminum or aluminum alloy. This typical panel P comprises a sheet or skin 10 and spaced stiffeners 11 on the sheet. It will be considered that the sheet 10 and stiffeners 11 are formed of aluminum and/or aluminum alloys. The panel P, illustrated, is a rectangular assembly or component. The upper and lower edges of the panel P are finished square to ordinary sheet metal tolerances. This is the only preparation required and it is to be noted that the accurate costly machining of the end parts of a test panel, essential in conventional methods of compression testing, is avoided in carrying out the present invention.

The upper and lower end portions of the panel P are embedded in matrix material 12 contained in tubes 13. The end tubes 13 are simple elongate tubular elements of steel, or the like, having a suitable wall thickness. In practice I have found it desirable to construct the tubes 13 of lengths of seamless cold drawn steel tubing annealed prior to machining to relieve residual stresses that might otherwise cause excessive warping. The tubes 13 have a length slightly in excess of the horizontal dimension of the panel P. The dimensions of the tubes 13 will vary in different applications of the invention, but it is desirable to proportion them so that their walls have the desired flexibility and resiliency. The tubes 13 are slotted throughout their lengths, each having an axial gap or slot 14 of substantially 120° circumferential extent to freely admit or receive the panel P. The slots 14, in addition to allowing ready insertion of the panel P into the tubes 13 render the tubes radially flexible so that the clamp fixtures may flex the tube walls radially inward and subject the matrix material 12 to the clamping pressures.

The matrix material 12 which secures the opposite end portions of the panel P in the tubes 13, preferably has a low pouring temperature, a short setting period, and a substantial tensile, compressive and shear strength. Further, it is desirable to employ a material 12 having a high elastic limit in compression and a high coefficient of friction with the material of the specimen or panel P. I have found that the hydraulic setting gypsum product known commercially as Hydro-stone, and manufactured by the U. S. Gypsum Company, is satisfactory as a matrix material. This product when mixed with the proper proportion of water, is of a creamy consistency and is readily poured. The gypsum product is mixed at room temperature, sets in about fifteen minutes, and develops ample strength when allowed to harden about two hours. The set and hardened gypsum material has a brickette tensile strength of between 400 and 500 pounds per square inch and a compression strength of about 5,000 pounds per square inch, although it is capable of withstanding greater forces when confined in the end tubes 13. In addition to the characteristics of high strength, the Hydro-stone material is relatively light in weight and has little or no creep under load. Further, and of special importance, is the fact that the Hydro-stone produces a light chemical etch on aluminum and aluminum alloys and therefore develops a high coefficient of friction with such metals. Although I have obtained excellent results with the gypsum matrix material referred to above, it is to be understood that the invention is not confined to the use of this class of matrix materials and satisfactory results are obtainable with other materials such as Woods metal, plastic materials, sulphur with and without fillers, etc.

In casting an end portion of the panel P in an end tube 13, it may be preferred to first accurately orient the panel with respect to the horizontally disposed tube 13. A suitable jig, not shown, may be employed for this purpose. The panel is indexed centrally between the walls of the tube slot 14 and is arranged to have its end spaced a suitable distance from the bottom wall of the tube. The locating jig is then firmly fixed relative to the tube 13 and the panel P is raised clear of the tube. It may be desirable to temporarily close the opposite ends of the slotted end tube 13. The matrix material 12 is then poured into the tube 13 in a sufficient quantity to substantially fill the tube. The end portion of the panel P is then re-introduced into the tube 13 and securely held in position by the jig to have its end portion remain embedded in the matrix material 12. The panel P may be firmly held in place while the material 12 sets. In the event the panel P has tubular or closed section stiffeners 11, it is desirable to provide a vent opening in each stiffener at a point to be clear of the end tubes 13 to allow the escape of air from the stiffeners, so that the matrix material may freely flow into the stiffeners when the second end of the panel is cast or embedded in its tube 13.

In casting the second end of the panel P in its tube 13, the above procedure may be repeated. However, when indexing or orienting the panel preparatory to casting its second end it is desirable to obtain parallelism of the two tubes 13. This may be readily accomplished by means of a carpenter's level, or the equivalent. It is to be observed that the opposite end portions of the specimen or panel P may be easily and quickly embedded in the matrix material 12 of the two end tubes 13. In Figures 3 and 5 it will be noted that the matrix material 12 completely encases and confines the opposite end portions of the panel P. The depth to which the panel ends are embedded depends upon the diameter of the tubes 13. Where the tubes have an outside diameter of four inches the panel has about two inches of its length embedded in the material 12 of each tube. The panel P is spaced clear of the end tubes 13 and is contacted solely by the matrix material 12. The opposite ends of the panel P are rigid with, and in effect, integral with the steel end tubes 13 which are parallel to one another throughout the entire width of the panel.

The invention further includes fixtures F attachable to the testing machine and operable to clamp the end tubes 13 for the transmission of the axial test loads to the panel P. These fixtures F are in the nature of separate units and it is preferred to provide sets of identical or standard units useful in connection with the testing of specimens of different widths. In the particular case illustrated in Figure 1, there are four like units or fixtures F at each end of the panel P. The several fixtures F may be identical and I will proceed with a description of one fixture, it being understood that this description is applicable to the other units or fixtures.

Each clamp fixture F embodies a mounting or supporting base 15. The base 15 is in the form of a rectangular plate of substantial width. The broad base of the clamping fixture prevents the fixture from rocking away from the platens 16 of the test machine when extensive bowing of the panel P occurs during the test. The broad base 15 also prevents rotation of the fixture and end of the panel P, even though there may be considerable eccentricity of loading. The base 15 carries two longitudinally extending parallel knife edge supports 17. The supports 17 are secured to the upper side of the base 15 adjacent its longitudinal edges by suitable screws 18. Two spaced parallel guides 19 are attached to the top of the base 15 by similar screws 20. The guides 19 are spaced at opposite sides of the longitudinal axis of the base.

The clamping fixture further includes a pair of opposing jaws 21 adapted to engage about and clamp the end tube 13 of the panel. The jaws 21 have cylindrically curved concave inner surfaces 22 for conforming to the tube. The surfaces 22 are of substantial extent so that the tube 13 is engaged throughout practically its entire circumference. The jaws 21 are provided with base flanges 23 and reinforcing ribs 24 connect the active curved portions of the jaws with the base flanges. The lower sides of the base flanges 23 are flat and horizontal except in zones adjacent their inner edges where they have upwardly and inwardly sloping or cylindrically curved surfaces 42. The base flanges 23 of the two jaws 21 rest upon the upper plate of a pair of superimposed flexible plates 25. The flexible plates 25 extend for the entire length of the base flanges 23 and have their longitudinal edges adjacent the corresponding edges of the flanges. While a single flexible plate 25 may be employed it is preferred to use the two superimposed plates to obtain the required strength and yet provide for the desired flexibility. Elongate rectangular strips 26 engage the lower side of the under plate 25 along its opposite longitudinal edges. The base flanges 23, the flexible plates 25 and the strips 26 are secured together by spaced bolts 27 engaged through vertical openings in the parts.

Two spaced blocks or pads 28 are secured to the under side of each strip 26 to mount the respective jaw 21 on a support 17 of the fixture base 15. The supports 17 are in the form of elongate fulcrums of the knife edge type and the pads 28 have flat lower surfaces for bearing on the crowns or edges of the supports. With this mode of support the jaws 21 are capable of rotation about axes spaced a substantial distance at each side of the central axial plane of the panel P. The pads 28 may have sockets or openings receiving the heads of the bolts 27 and the pads may be attached to the strips 26 by suitable screws 30. It will be seen that upon application of axial pressure to the panel P through the medium of the fixture F the loads transmitted from the lower portions of the jaw surfaces 22 to the tube 13 result in rotation of the jaws about their individual axes of rotation to cause the jaws to exert a clamping pressure on the tube 13, the matrix material 12 and the panel end. This clamping force is proportional to the axial loading and increases as the test load is amplified. The plates 25 flex during the pivoting or rotating of the jaws 21 and the pitched or curved surfaces 42 allow rotation of the jaws with the slightly bowed plates without concentrating loads on the plates.

The clamp fixture further includes a screw thread actuated means for initially operating the jaws 21 to facilitate the accurate aligning and positioning of the panel P prior to the application of the actual test loads. This means includes loading plates 31 arranged between the spaced pads 28 of the jaw assemblies and secured to the base flanges 23 by bolts 32. The supports 17 may be notched out to receive the heads of the bolts. A single assembly bolt 33 may pass through over size vertical openings in the base flange 23, flexible plates 25, the loading plate 31 to hold the several parts of each jaw unit in the assembled relation. The bolts 33 may have their heads counter-sunk in the under side of the base plate to retain the jaw assembly in position on the base. The loading plates 31 extend inwardly and have downturned flanges 34 extending along their inner edges. The flanges 34 engage the outer faces of the above referred to guides 19.

The screw actuated mechanism includes an elongate rotatable rod or stem 35 arranged horizontally in the space between the guides 19. Spaced portions of the stem 35 carry screw threads 36. One thread 36 is a right-hand thread and the other is a left-hand thread. A trunnion block 37 is engaged on each threaded portion of the stem 35. The blocks 37 have threads in their openings mating with the screw threads 36. Trunnions 38 project from the opposite sides of the blocks 37 and slidably operate in slots 39 and 40 in the guides 19 and flanges 34. The slots 39 in the guides 19 slope upwardly and toward the opposite ends of the fixture. Although the slots 40 in the plate flanges 34 are shown sloping downwardly and toward the opposite ends of the fixture, they may be horizontal. At least one end of the screw stem 35 is prepared for engagement by a wrench, or the like. In the drawings I have shown a polygonal head 41 on an end of the stem 35. Upon rotation of the screw stem 35 in one direction the trunnions 38 move toward one another and their cooperation with the oppositely pitched slots 39 and 40 moves the jaws 21 about their individual axes of rotation to clamp the tube 13. Rotation of the screw stem 35 in the other direction causes movement of the blocks 37 and trunnions 38 toward the opposite ends of the fixture and the trunnions moving through the slots 39 and 40 rotate the jaws 21 outwardly or away from the tube 13. The head 41 of the screw stem is accessible from the end of the fixture for ready engagement by a socket wrench, or the like. Sufficient space remains between the base 15 and the elements thereabove, so that the head 41 of the screw stem 35, embodied in a fixture which is the second in order from an end of a series of fixtures, may readily be engaged by a long handled wrench. In operating the screw actuated mechanism it may be preferred to employ a torque responsive wrench, or torque indicating wrench to avoid straining of the mechanism.

One or more fixtures F of the character above described may be arranged on each platen 16 of the test machine, the number of fixtures employed depending upon the width of the specimen to be tested. The fixtures F may be secured to the platens 16 in any appropriate manner. For example, the fixtures F may be removably secured to the platens 16 by suitable clamps 43. Where a plurality of fixtures F is required at each end of the panel P it is preferred to arrange the fixtures in engaging or close relation as shown in Figure 1.

In employing the apparatus, the opposite end portions of the panel P are embedded or cast in the matrix material 12 as described in detail above. The required number of fixtures F is then slid on each end tube 13 of the panel and the assembly is arranged in the test machine. When the machine embodies an adjustable upper platen or head carried by two spaced threaded columns 44 the position of the panel P transversely with respect to these columns is important because the machine head acts somewhat as a balanced beam and is not rigid. However, the position of the panel P may be readily determined from geometric considerations of the panel, and once determined, will not change upon the application of the test load. Prior to clamping the end fixtures F an initial load is preferably applied by the test machine to "set" the testing machine. The specimen or panel P is then checked for vertical alignment and straightness. The cylindrical end tubes 13 and the cylindrical surfaces 22 of the fixture jaws 21 allow for ample automatic and manual adjustment of the panel P to obtain the required setting or positioning of the panel. The fixtures F may then be actuated by their screw threaded mechanisms to solidly clamp or grip the tubes 13, whereupon the test load may be applied.

As the test load is applied, the jaws 21 of the fixture F rotate toward one another under the axial loading and subject the end tubes 13 and matrix material 12 to compression. The forces thus developed are transmitted to the panel P by the material 12 which has good frictional contact with the panel. The material 12 is in effect subjected to hydrostatic pressure to transmit uniformly distributed fixing pressures to the panel P. There is greatly reduced possibility of eccentric loading, rotation of the panel ends or non-uniform loading of the panel ends. In fact, the apparatus is such that for all practical purposes it may be considered that full fixity of the panel ends is obtained. With full fixity assured the obtaining or formulating of accurate test data is greatly simplified and expedited.

At the completion of the test the fixtures F may be detached from the testing machine and released so that they may be slid from the end tubes 13. The simple rotation of the screw stems 35 rotates the clamp jaws 21 to the released positions to free the fixtures for easy removal from the end tubes 13. The matrix material 12 may be removed from the end tubes 13 so that the tubes may be re-used in subsequent tests.

Having described only a typical form of the invention I do not wish to be limited to the specific details herein set forth, but wish to reserve to myself any variations or modifications that may appear to those skilled in the art or fall within the scope of the following claims.

I claim:

1. Apparatus useful in compression testing a specimen having an appreciable dimension transverse of the direction of the compression to be applied comprising tubes to be arranged with their long axes transverse of said direction of compression and having axial slots receiving the opposite end portions of the specimen, matrix material in the tubes embedding said end portions, and fixtures for clamping radially inward on the tubes and operable to transmit the compression test loading to the tubes.

2. Apparatus useful in compression testing a specimen having an appreciable dimension transverse of the direction of the compression to be applied comprising tubes to be arranged with their long axes transverse of said direction of compression and having axial slots receiving the opposite end portions of the specimen, matrix material in the tubes confining the end portions of the specimen and spacing the same from the tubes, and clamp fixtures engaging the tubes and operable to transmit the compression test loading to the tubes.

3. Apparatus useful in compression testing a specimen comprising a cylindrical tube at each end of the specimen having an axial slot receiving the specimen, bodies of matrix material cast in the tubes for embedding the end parts of the specimen therein, and at least one clamp fixture having a cylindrical opening receiving each tube for initial adjustment, and means for supporting the clamp fixture to automatically clamp inwardly on the tube when the assembly is subjected to compressive forces, said means including force-transmitting fulcrums cooperating with the fixture to support and actuate the same.

4. Apparatus useful in compression testing a specimen comprising a tube at each end of the specimen having an axial slot receiving the specimen, bodies of matrix material cast in the tubes and embedding the end parts of the specimen therein, and at least one clamp fixture engaging about each tube and operable to automatically clamp inwardly thereupon when the assembly is subjected to compressive forces, each fixture including a pair of jaws, and knife-edge means supporting the jaws for rotation toward one another.

5. Apparatus useful in compression testing a specimen comprising a cylindrical member rigid with each end of the specimen and at least one clamp fixture engaging about each member and operable to automatically clamp inwardly thereupon when the assembly is subjected to compressive forces, each fixture including a pair of jaws defining a substantially cylindrical opening adjustably receiving the member and knife-edge means supporting the jaws for rotation toward and away from one another.

6. Apparatus useful in compression testing a specimen comprising a tube rigid with each end of the specimen and at least one clamp fixture engaging about each tube and operable to automatically clamp inwardly thereupon when the assembly is subjected to compressive forces, each fixture including a base, a pair of jaws for clamping about a tube, fulcrum means on the base supporting the jaws for rotation toward one another to clamp the tube when the testing compression is applied, and a flexible coupling between the jaws.

7. Apparatus useful in compression testing a specimen comprising a tube at each end of the specimen having an axial slot receiving the specimen, bodies of matrix material cast in the tubes and embedding the end parts of the specimen therein, and at least one clamp fixture engaging about each tube and operable to automatically clamp inwardly thereupon when the assembly is subjected to compressive forces, each fixture including a base, a pair of opposing jaws having surfaces for substantially conforming to a tube, fulcrum means on the base supporting the jaws for rotation toward one another about axes spaced laterally from said surfaces whereby the jaws rotate toward one another to grip the tube upon the application of the testing pressure, and manually operable means for rotating the jaws toward and away from one another.

8. Apparatus useful in compression testing a specimen comprising a tube rigid with each end of the specimen and at least one clamp fixture engaging about each tube and operable to automatically clamp inwardly thereupon when the assembly is subjected to compressive forces, each fixture including a base, a pair of opposing jaws having surfaces for conforming to a tube, fulcrum means on the base supporting the jaws for rotation toward one another about axes spaced laterally from said surfaces whereby the jaws rotate toward one another to grip the tube upon the application of the testing pressure, and screw thread actuated means for rotating the jaws toward and away from one another.

9. Apparatus useful in compression testing a specimen comprising a tube at each end of the specimen having an axial slot receiving the specimen, bodies of matrix material cast in the tubes and embedding the end parts of the specimen therein, and at least one clamp fixture engaging about each tube and operable to automatically clamp inwardly thereupon when the assembly is subjected to compressive forces, each fixture including a base, a pair of opposing jaws having surfaces for conforming to a tube, fulcrum means on the base supporting the jaws for rotation toward one another about axes spaced laterally outward from said surfaces whereby the jaws rotate toward one another to grip the tube upon the application of the testing pressure, and superimposed flexible plates coupled between the jaws, the plates being flexed upon said rotation of the jaws toward one another.

10. Apparatus useful in compression testing a specimen comprising a tube rigid with each end of the specimen and at least one clamp fixture engaging about each tube and operable to automatically clamp inwardly thereupon when the assembly is subject to compressive forces, each fixture including a base, a pair of jaws each having a base flange opposing said base and having a surface on its inner side conforming generally to the tube, a flexible plate connecting said base flanges, and spaced ridges on the base each supporting a jaw for rotation about an axis remote from said surface of the respective jaw whereby the jaws swing toward one another to clamp the tube when the test loading is applied.

11. Apparatus useful in compression testing a specimen comprising a member rigid with each end of the specimen and at least one clamp fixture for engaging about each member and operable to automatically clamp inwardly thereupon when the assembly is subjected to compressive forces, each fixture including a base, a pair of jaws each having a base flange spaced from said base and each having an inner surface for substantially conforming to a member, flexible plate means connecting the base flanges of the jaws, bearing pads carried by the flanges, fulcrum ridges on said base cooperating with the bearing pads to support the jaws for rotation about axis parallel with the member and remote from said surfaces whereby the jaws are swung toward one another to clamp the member upon transmitting the test load through the fixture, and manually operable for rotating the jaws.

12. Apparatus useful in compression testing a specimen in a testing machine comprising end tubes rigid with opposite ends of the specimen, fixtures adapted to be secured to the machine operable to clamp about said tubes and transmit the testing load to the tubes and panel, each fixture comprising a base, a pair of jaws, means associating the jaws with the base to automatically rotate into clamping engagement with a tube upon the application for the testing load to the base, and manually operable means for initially rotating the jaws comprising parts on the base and jaws having cam slots, and screw actuated trunnions operable in the slots to rotate the jaws.

13. Apparatus useful in testing a specimen in a test machine, the specimen having an appreciable dimension transverse of the direction of the test load to be applied, the apparatus comprising a cylindrical member adapted to be rigidly associated with each end of the specimen to have its long axis extend transverse of said direction of load, and means attachable to the machine and adjustably receiving the cylindrical members to allow initial alignment of the specimen.

14. Apparatus useful in testing a specimen in a test machine, the specimen having an appreciable dimension transverse of the direction of the test load to be applied, the apparatus comprising a cylindrical member adapted to be rigidly associated with each end of the specimen to have its long axis extend transverse of said direction of load, and clamp fixtures adapted to be attached to the machine and defining cylindrical openings for receiving said members to allow initial alignment of the specimen, and means operable upon the application of the test loading for actuating the fixtures to clamp the members.

PAUL E. SANDORFF.

REFERENCES CITED

The following references are of record in the file of this patent:

UNITED STATES PATENTS

| Number | Name | Date |
| --- | --- | --- |
| 1,224,530 | Goetzke | May 1, 1917 |
| 2,014,688 | Mabboux | Sept. 17, 1935 |
| 2,364,512 | Bower | Dec. 5, 1944 |

FOREIGN PATENTS

| Number | Country | Date |
| --- | --- | --- |
| 758,021 | France | Oct. 23, 1933 |

OTHER REFERENCES

"Mechanical Testings," by Batson & Hyde, Publ. by Chapman & Hall, Ltd., London, 1922, vol. 1, pg. 82.